June 25, 1968

I. WILSON ET AL 3,389,901

SPRING CLUTCH ANCHOR

Filed Sept. 15, 1966

INVENTORS
IAN WILSON
ERWIN MUNZINGER
BY

June 25, 1968     I. WILSON ET AL     3,389,901
SPRING CLUTCH ANCHOR

Filed Sept. 15, 1966     2 Sheets-Sheet 2

INVENTORS
IAN WILSON
BY    ERWIN MUNZINGER

United States Patent Office 3,389,901
Patented June 25, 1968

3,389,901
SPRING CLUTCH ANCHOR
Ian Wilson, Pinole, and Erwin K. Munzinger, Oakland, Calif., assignors, by mesne assignments, to Control Data Corporation, a corporation of Minnesota
Filed Sept. 15, 1966, Ser. No. 579,552
9 Claims. (Cl. 267—1)

This invention relates to a tape punch mechanism for use with electronic computers. More specifically, this invention relates to the means employed in the punch mechanism for anchoring one end of a spring clutch which is used in driving the punch elements.

A complete description of a punch mechanism with which our invention can be used is found in application Ser. No. 338,359, filed Jan. 17, 1964, now Patent No. 3,301,477, for a tape punch using a spring clutch.

Our invention is primarily concerned with a spring clutch drive and with the design used in anchoring one end of the spring clutch to a support element or driving cam. In this regard, one of the objects of our invention is to provide an anchor for a spring clutch which will hold the spring tight and in a manner that will reduce fatigue in the spring.

Another object of this invention is to provide a spring anchoring device which has no reverse bends and comes off the main coil in a straight line from a point of tangency.

A further object of this invention is to provide an anchoring device which has a novel anchoring pin design for providing maximum strength with a minimum of stress points.

A still further object of this invention is to provide a spring anchoring device in which the spring is easily installed.

The above and other objects and advantages of the invention will be apparent from the following description, when read in connection with the accompanying drawing, in which.

Figure 2:
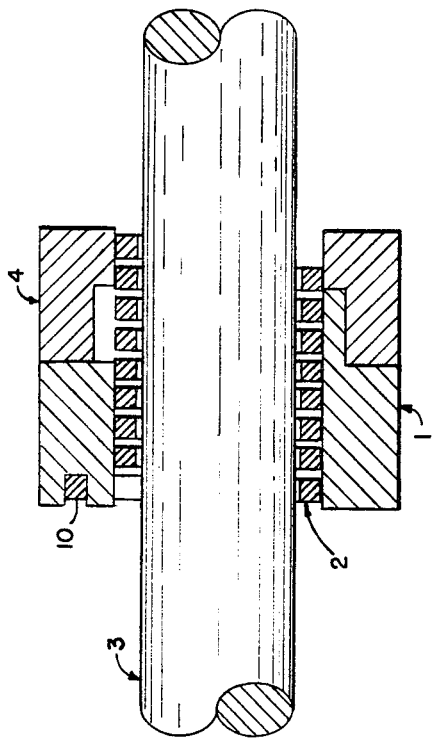
FIGURE 2 is a partial section view taken along line 2—2 of FIGURE 1 and showing the spring unwound as compared to FIGURE 1.

Referring now in more detail to the accompanying drawing, the anchoring device will be described with reference to a spring support cam element 1, clutch spring 2, drive shaft 3, ratchet 4, cam follower 20, and latch means 19.

Figure 5:
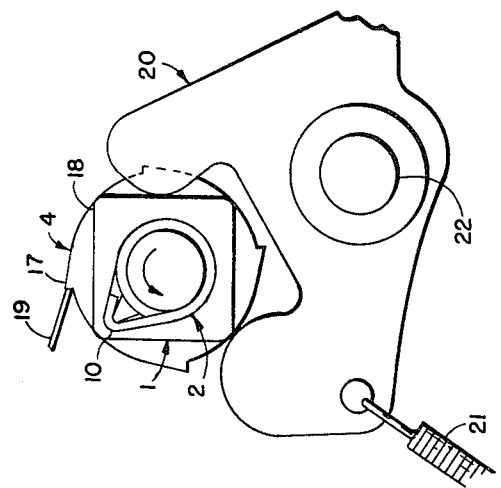
FIGURE 5 is an end view of the spring clutch showing a cam follower and latch mechanism, drawn on a reduced scale relative to that of FIGURES 1–4.

In a spring clutch to which this invention may be applied, the shaft 3 is continually rotated counterclockwise as shown in FIGURE 5 by a power source (not shown). The clutch spring 2 is a left-hand wound spring and has an inside diameter smaller than the diameter of shaft 3 and must be expanded in order to fit over shaft 3. The spring is expanded by anchoring a first end 10 of the spring in a spring support cam element 1 and anchoring the second end 9 of the spring in a ratchet 4 and by having a latch release mechanism 19 engage a ratchet tooth element 17 on ratchet 4 and having a cam follower 20 pivotally mounted at 22 engage one of the four corner portions 18 on the spring support cam element 1. When the latch release mechanism 19 is holding the ratchet 4, the cam follower 20 under the pressure of spring 21 will urge the spring support cam element 1 counterclockwise as shown in FIGURE 5 and will thus have a tendency to unwind spring 2 which will increase the inside diameter of spring 2 so that it will fit loosely around the drive shaft 3. It can be readily seen that by releasing a latch mechanism 19 from the ratchet teeth 17, the corresponding end of the spring will be free which will allow the spring to tighten around the drive shaft 3. Thus the spring support cam element 1 will be driven counterclockwise as seen in FIGURE 5 along with the drive shaft 3 and in turn cause cam follower 20 to be moved by the four corners 18 of the spring support cam element 1. The drive from the drive shaft 3 to the spring support cam element 1 can be stopped by allowing the latch release mechanism 19 to again engage the ratchet teeth. From the above description of the drive mechanism, it can be seen that when the punch (not shown) operated by cam follower 20 encounters the tape (also not shown) a tremendous force is exerted on the spring end 10 anchored to the spring support cam element 1, making end 10 highly susceptible to breakage.

Since this invention is only concerned with the anchoring of spring end 10, the complete operation of the spring clutch drive mechanism will not be described further herein. Reference is made to the above-mentioned application Ser. No. 338,359, filed Jan. 17, 1964, for a complete description of the spring clutch drive mehcanism.

Figure 4:
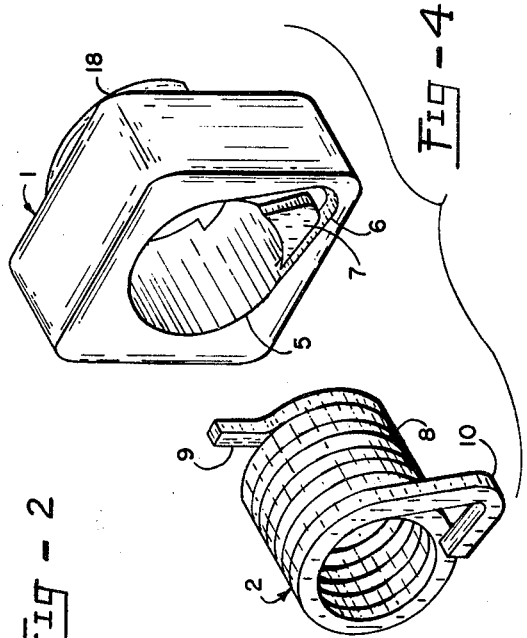
FIGURE 4 is an exploded view of the spring clutch and spring support cam element.
Figure 1:
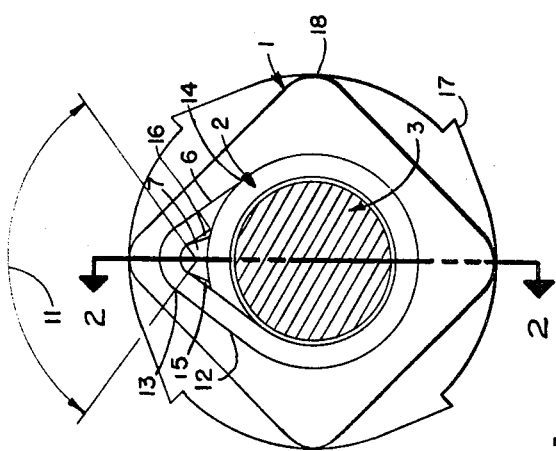
FIGURE 1 is an end view looking from left to right of FIGURE 2 of the spring clutch anchoring device with the drive shaft shown in section.
Figure 3:
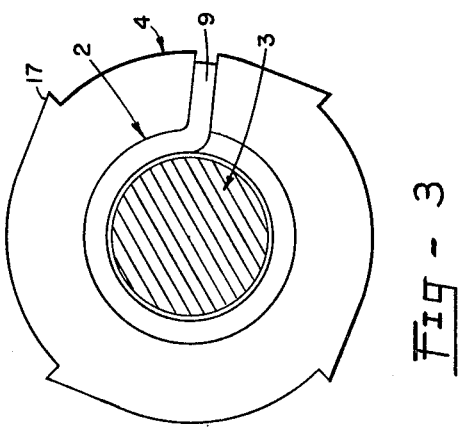
FIGURE 3 is an end view as seen from the right of FIGURE 2.

Referring now particularly to FIGURES 2 and 4 of the drawing, the spring 2 includes a main coil portion 8 and two end portions 9, 10. Spring end portion 10 is formed, according to the invention, into a substantially V-shaped design with the legs of the V being tangent to the main coil portion. The spring support cam element 1 includes an aperture 5 into which the main coil 8 of the clutch spring 2 is mounted. One face of the spring support cam element 1 includes a substantially V-shaped cavity 6 (FIGURES 1 and 4) which surrounds a "bell-shaped" anchoring post 7. When the spring 2 is in place in the spring support cam element 1, the spring end 10 fits in the cavity 6. The cavity 6 for the spring is controlled with a tight tolerance throughout the region of angle 11 shown in FIGURE 1. The tight tolerance restricts the spring movement and, therefore reduces fatigue. The spring support cam element 1 is detailed so that the spring anchor cavity 6 is tangent at point 13 and tangent or slightly relieved at points 12 and 14. This is done to eliminate the possibility of inducing a stress point at the points of tangency. The anchor post 7 is detailed so that there is always clearance at points 15 and 16, to eliminate the possibility of a stress point. The spring end 10 is made with the angle of its V slightly larger than that of the V of the cavity 6 so that the end 10 snaps into place around post 7 under tension. This design of the spring anchor has no reverse bends and comes off the main coil in a straight line from the point of tangency.

While one embodiment of the invention has been shown and described in detail herein, it will be understood that this is illustrative only and is not intended as a definition of the scope of the invention, reference being had for this purpose to the appended claims.

What is claimed is:

1. An anchoring device comprising the combination of, a helical spring having a coil portion and an anchoring end, and spring support means operatively associated with said spring end including a cavity portion substantially complementary to said anchoring end with said anchoring end fitted therein for anchoring said spring to said spring support wherein said anchoring end is substantially V-shaped with one leg of the V coming off said coil portion.

2. An anchoring device as defined in claim 1 in which said one leg lies in a straight line tangent to one side of said coil portion.

3. An anchoring device as defined in claim 2 in which the other leg of said V-shaped anchoring end lies substantially along a tangent to the opposite side of said coil portion.

4. An anchoring device as defined in claim 3 in which the V of said anchoring end forms a first angle and said complementary cavity portion forms a second angle smaller than said first angle.

5. An anchoring device as defined in claim 2 in which said spring support means is coaxial with said spring coil portion.

6. An anchoring device as defined in claim 5 in which said spring support means surrounds said spring coil portion.

7. An anchoring device as defined in claim 6 in which said cavity in said spring support means surrounds an anchoring post.

8. An anchoring device as defined in claim 7 in which said anchoring post is substantially bell-shaped including a top arcuate portion and two corner portions.

9. An anchoring device as defined in claim 8 in which said bell-shaped anchoring post is located in said cavity portion so that the width of said cavity adjacent said corner portions is greater than the width of said cavity adjacent said arcuate portion.

References Cited

UNITED STATES PATENTS

| 1,924,604 | 8/1933 | Gray | 267—1 |
| 3,357,664 | 12/1967 | Geyer | 267—1 |

FOREIGN PATENTS 1,086,385  8/1960  Germany.

ARTHUR L. LA POINT, *Primary Examiner.*

R. M. WOHLFARTH, *Assistant Examiner.*